Nov. 20, 1928.
B. BROIDO ET AL
1,692,154
SUPERHEATER HEADER
Filed Nov. 13, 1926
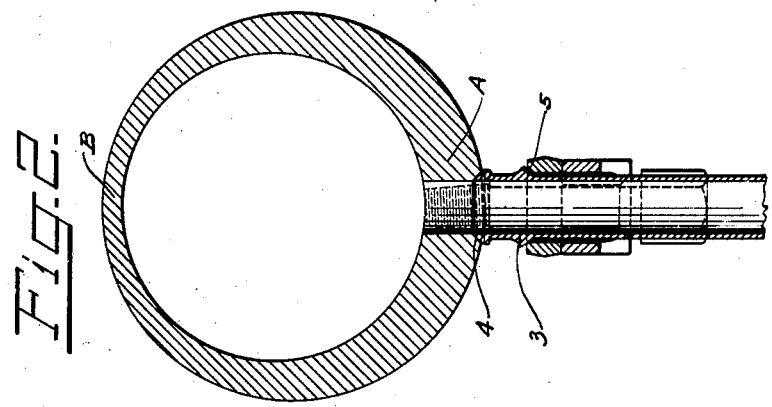
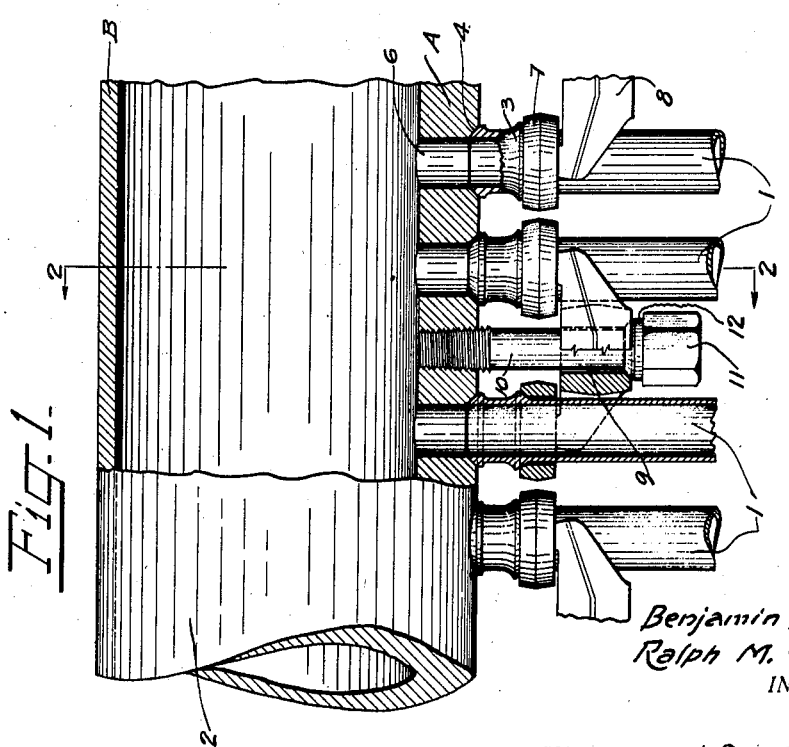
Benjamin Broido
Ralph M. Swartz
INVENTORS
BY O. V. Thiele
ATTORNEY.

Patented Nov. 20, 1928.

1,692,154

UNITED STATES PATENT OFFICE.

BENJAMIN BROIDO, OF NEW YORK, N. Y., AND RALPH M. SWARTZ, OF BOGOTA, NEW JERSEY, ASSIGNORS TO THE SUPERHEATER COMPANY, OF NEW YORK, N. Y.

SUPERHEATER HEADER.

Application filed November 13, 1926. Serial No. 148,139.

The invention relates to the art of securing pipes or tubes to chambers in a detachable manner and has particular reference to superheaters where the ends of tubular elements or units must be secured to headers. It has for its purpose the provision of improved means of this nature.

The invention is illustrated in the attached drawings where Fig. 1 is a fragmentary view, partly in longitudinal section and partly in elevation, of a superheater header with the elements attached to it by our improved means; and Fig. 2 is a sectional view on line 2—2 of Fig. 1.

The art of superheating employs extensively clamping means for securing the ends of tubular superheater elements or units into firm engagement with the headers from which they take, or to which they deliver steam. These means comprise a clamp with a central aperture through which the bolt or stud extends which draws the clamp toward the header. Where piping of ordinary commercial gauges is used for header material, and this stud is screwed into the header wall, certain difficulties are encountered, which are pointed out in U. S. Patent 1,363,713, granted on December 28, 1920, and which are overcome by the means protected by said patent. These difficulties are that the stud cannot be securely screwed into wall thicknesses such as referred to, and that the deformation of the pipe walls, as the nuts are drawn up causes further trouble.

The object of the present invention is to provide means different from those of said patent, and under some conditions preferable to them.

If a header is made of pipe of sufficient wall thickness, no such reinforcing bar as disclosed in the patent would be necessary. But to use pipe of the thickness required for this purpose would be rather a wasteful proceeding as the thickness would be far beyond what is required to withstand the pressures used, even where these are of the so-called high pressure order, that is, pressures running from 1,000 to 1,500 lbs. per square inch.

Moreover, such a pipe would be disproportionately heavy to handle during machining, shipping, erecting, etc. Our invention presents all the advantages of such thick piping but avoids the disadvantages pointed out.

Referring to the drawing there are shown in Fig. 1 the ends 1—1 of tubular superheater elements which are to be secured to the header 2. This header 2 may supply steam to the elements 1 or they may deliver steam to it. The other ends of the elements (not shown) may be secured to a corresponding header.

The ends of each element will be seen to have an enlarged head 3, the upper and lower surfaces 4 and 5 respectively, lying on the surface of a common sphere. The surface 4 engages a seat on the header wall from which an opening 6 extends through the wall to the interior of the header. The lower surface 5 of each head is engaged by a washer 7 and the lower surfaces of these washers 7 are engaged by the clamps 8. Each of these clamps has its ends bifurcated and has an opening 9 through its center through which opening extends a stud 10. This stud 10 is screwed into the header wall as is clearly illustrated in the drawing. Its opposite end is also threaded and has a nut 11 on it. Between this nut 11 and the clamp, there is placed a washer 12. The unit or element ends can evidently be pulled up tightly against the seats in the header wall by pulling up the nuts 11.

This construction for securing the ends of superheater elements to a header is not in itself novel, but has been in extensive use for some time. If the header wall is not thick enough the studs 10 will not have sufficient anchorage, as pointed out above, and will pull out when the nut 11 is tightened. In addition the tightening up of one nut will be likely to affect the joint between the header and the adjacent element ends. The means heretofore disclosed for obviating these difficulties are to make the header with a wall on the side of which the units or elements are to be secured thicker than the remaining portion of the walls. This appears clearly in the drawings, the wall being much thicker at A than at B. The preferred manner in which this is accomplished is by making the pipe out of a solid billet, boring a hole through it eccentrically with the outside. In some cases, it may be feasible to forge a rough blank for this purpose and boring the interior eccentrically, although this is not the way in which we prefer to make the header. In this manner, it will be seen that sufficient thickness of metal is provided for the studs, while the waste which would result in making the walls of this thickness all around is avoided.

What we claim is:

In apparatus for conveying fluid under pressure, in combination, an externally cylindrical header with an eccentric cylindrical bore therein and a series of alined holes in the thickest part thereof; tubular elements having ends engaging said holes; clamping means for holding said element ends in engagement with said holes; and holding studs engaging the clamping means and screwed into the thickest part of said header, the thickness of said part being at least equal to the effective stud diameter.

BENJAMIN BROIDO.
RALPH M. SWARTZ.